(12) United States Patent
Narayanan et al.

(10) Patent No.: US 12,311,925 B2
(45) Date of Patent: May 27, 2025

(54) DIVIDE-AND-CONQUER FOR LANE-AWARE DIVERSE TRAJECTORY PREDICTION

(71) Applicant: NEC Laboratories America, Inc., Princeton, NJ (US)

(72) Inventors: Sriram Nochur Narayanan, San Jose, CA (US); Ramin Moslemi, Pleasanton, CA (US); Francesco Pittaluga, Los Angeles, CA (US); Buyu Liu, Cupertino, CA (US); Manmohan Chandraker, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 828 days.

(21) Appl. No.: 17/521,139

(22) Filed: Nov. 8, 2021

(65) Prior Publication Data
US 2022/0144256 A1     May 12, 2022

Related U.S. Application Data

(60) Provisional application No. 63/113,434, filed on Nov. 13, 2020, provisional application No. 63/111,674, filed on Nov. 10, 2020.

(51) Int. Cl.
*B60W 30/095*     (2012.01)
*G06F 16/29*     (2019.01)
*G06N 3/08*     (2023.01)

(52) U.S. Cl.
CPC ......... *B60W 30/0956* (2013.01); *G06F 16/29* (2019.01); *G06N 3/08* (2013.01); *B60W 2552/53* (2020.02)

(58) Field of Classification Search
CPC ........... B60W 30/0956; B60W 2552/53; G06F 16/29; G06F 16/285; G06N 3/08; G06N 3/045; G08G 1/166; G08G 1/167
See application file for complete search history.

(56) References Cited

U.S. PATENT DOCUMENTS 10,438,082 B1 * 10/2019 Kim ..................... G06N 20/00
2016/0001784 A1 * 1/2016 Markkula ............. B60W 30/02
                                                                        701/41
(Continued)

OTHER PUBLICATIONS

Cui, Henggang, et al. "Multimodal trajectory predictions for autonomous driving using deep convolutional networks." 2019 international conference on robotics and automation (icra). IEEE, 2019, pp. 2090-2096. (Year: 2019).*

(Continued)

*Primary Examiner* — Omar F Fernandez Rivas
*Assistant Examiner* — Michael C. Lee
(74) *Attorney, Agent, or Firm* — Joseph Kolodka

(57) ABSTRACT

A method for driving path prediction is provided. The method concatenates past trajectory features and lane centerline features in a channel dimension at an agent's respective location in a top view map to obtain concatenated features thereat. The method obtains convolutional features derived from the top view map, the concatenated features, and a single representation of the training scene the vehicle and agent interactions. The method extracts hypercolumn descriptor vectors which include the convolutional features from the agent's respective location in the top view map. The method obtains primary and auxiliary trajectory predictions from the hypercolumn descriptor vectors. The method generates a respective score for each of the primary and auxiliary trajectory predictions. The method trains a vehicle trajectory prediction neural network using a reconstruction loss, a regularization loss objective, and an IOC loss objective responsive to the respective score for each of the primary and auxiliary trajectory predictions.

16 Claims, 6 Drawing Sheets

(56) References Cited

U.S. PATENT DOCUMENTS

| | | | |
|---|---|---|---|
| 2017/0031361 A1* | 2/2017 | Olson | G06V 20/56 |
| 2019/0286921 A1* | 9/2019 | Liang | G06F 16/909 |
| 2020/0089238 A1* | 3/2020 | McGill, Jr. | G05D 1/0257 |
| 2020/0379461 A1* | 12/2020 | Singh | G05D 1/0088 |
| 2021/0001843 A1* | 1/2021 | Pan | B60W 30/0956 |
| 2023/0079624 A1* | 3/2023 | Maeda | B60W 60/001 701/25 |

OTHER PUBLICATIONS

Izquierdo, R., et al. "Vehicle Trajectory Prediction in Crowded Highway Scenarios Using Bird Eye View Representations and CNNs." arXiv preprint arXiv:2008.11493 (Aug. 26, 2020). (Year: 2020).*

Zhou, Yao, et al. "DA4AD: End-to-End Deep Attention-based Visual Localization for Autonomous Driving." arXiv preprint arXiv:2003.03026 (Jul. 13, 2020). (Year: 2020).*

Zaman, Mostafa, Nasibeh Zohrabi, and Sherif Abdelwahed. "A CNN-based path trajectory prediction approach with safety constraints." 2020 IEEE Transportation Electrification Conference & Expo (ITEC). IEEE (2020), pp. 267-272 (Year: 2020).*

Gadosey, Pius Kwao, et al. "SEB-Net: revisiting deep encoder-decoder networks for scene understanding." Proceedings of the 2020 6th International Conference on Computing and Artificial Intelligence (Aug. 2020), pp. 542-551 (Year: 2020).*

Wang, Eason, et al. "Improving movement predictions of traffic actors in bird's-eye view models using GANs and differentiable trajectory rasterization." Proceedings of the 26th ACM SIGKDD International Conference on Knowledge Discovery & Data Mining (Aug. 2020), pp. 2340-234 (Year: 2020).*

Ridel, Daniela, et al. "Scene compliant trajectory forecast with agent-centric spatio-temporal grids." IEEE Robotics and Automation Letters 5.2 (Apr. 2020), pp. 2816-2823 (Year: 2020).*

Amirian, J. et al., "Learning Multi-modal Distributions of Pedestrian Trajectories with GANs", The IEEE Conference on Computer Vision and Pattern Recognition (CVPR) Workshops. Jun. 2019.

Caesar, H. et al., "nuscenes: A Multimodal Dataset for Autonomous Driving", arXiv preprint arXiv:1903.11027. Mar. 26, 2019, pp. 1-16.

Chandra, R. et al., "TraPHic: Trajectory Prediction in Dense and Heterogeneous Traffic Using Weighted Interactions", Proceedings of the IEEE Conference on Computer Vision and Pattern Recognition. Jun. 2019, pp. 8483-8492.

Chang, M.F. et al., "Argoverse: 3D Tracking and Forecasting with Rich Maps", In: The IEEE Conference on Computer Vision and Pattern Recognition (CVPR). Jun. 2019, pp. 8748-8757.

Colyar, J. et al., "US Highway 101 Dataset", Federal Highway Administration (FHWA), Tech. Rep. FHWA-HRT-07-030. Jan. 2007.

Deo, N. et al., Convolutional Social Pooling for Vehicle Trajectory Prediction, CoRR abs/1805.06771 (2018), http://arxiv.org/abs/1805.06771. May 15, 2018, pp. 1-9.

Dosovitskiy, A. et al., "CARLA: An Open Urban Driving Simulator", Proceedings of the 1st Annual Conference on Robot Learning. Oct. 18, 2017, pp. 1-16.

Fang, J. et al., "Simulating LIDAR Point Cloud for Autonomous Driving Using Real-world Scenes and Traffic Flows", CoRR abs/1811.07112 (2018), http://arxiv.org/abs/1811.07112. Nov. 17, 2018, pp. 1-10.

Firl, J. et al., "Predictive Maneuver Evaluation for Enhancement of Car-to-x Mobility Data", 2012 IEEE Intelligent Vehicles Symposium. https://doi.org/10.1109/IVS.2012.6232217. Jun. 2012, pp. 558-564.

Gaidon, A. et al., "Virtual Worlds as Proxy for Multi-object Tracking Analysis", CoRR abs/1605.06457 (2016), http://arxiv.org/abs/1605.06457. May 20, 2016, pp. 1-10.

Geiger, A. et al., "Vision meets robotics: The Kitti Dataset", International Journal of Robotics Research (IJRR). Sep. 2013, pp. 1231-1237.

Gupta, A. et al., "Social GAN: Socially Acceptable Trajectories with Generative Adversarial Networks", 2018 IEEE/CVF Conference on Computer Vision and Pattern Recognition. https://doi.org/10.1109/CVPR.2018.00240. Jun. 2018, pp. 2255-2264.

Hong, J. et al., "Rules of the Road: Predicting Driving Behavior with a Convolutional Model of Semantic Interactions", The IEEE Conference on Computer Vision and Pattern Recognition (CVPR). Jun. 2019, pp. 8454-8462.

Ivanovic, B. et al., "The trajectron: Probabilistic Multi-agent Trajectory Modeling with Dynamic Spatiotemporal Graphs", InProceedings of the IEEE/CVF International Conference on Computer Vision. Oct. 2019, pp. 2375-2384.

Johnson-Roberson, M. et al., "Driving in the Matrix: Can Virtual Worlds Replace Human-generated Annotations for Real World Tasks?", CoRR abs/1610.01983, http://arxiv.org/abs/1610.01983. Oct. 6, 2016, pp. 1-8.

Kalman, R.E., "A New Approach to Linear Filtering and Prediction Problems", Journal of basic Engineering. Mar. 1960, pp. 1-12.

Kitani, K.M. et al., "Activity forecasting", European Conference on Computer Vision, Springer. Oct. 7, 2012, pp. 201-214.

Kosaraju, V. et al., "Social-bigat: Multimodal Trajectory Forecasting Using Bicycle-GAN and Graph Attention Networks", CoRR abs/1907.03395, http://arxiv.org/abs/1907.03395. Jul. 4, 2019, pp. 1-10.

Lee, N. et al., "Desire: Distant Future Prediction in Dynamic Scenes with Interacting Agents", 2017 IEEE Conference on Computer Vision and Pattern Recognition (CVPR). Jul. 2017, pp. pp. 336-345.

Leurent, E., "A Minimalist Environment for Decision-making in Autonomous Driving", https://github.com/eleurent/highway-env. Sep. 7, 2020.

Li, Y., "Which Way Are You Going? Imitative Decision Learning for Path Forecasting in Dynamic Scenes", Proceedings of the IEEE Conference on Computer Vision and Pattern Recognition. Jun. 2019, pp. 294-303.

Ma, Y. et al., "Trafficpredict: Trajectory Prediction for Heterogeneous Traffic-agents", arXiv preprint arXiv:1811.02146. Jul. 17, 2018, pp. 6120-6127.

Rasmussen, C.E. et al., "Gaussian Processes for Machine Learning", (Adaptive Computation and Machine Learning). The MIT Press. Jul. 2005, pp. 1019-1041.

Rhinehart, N. et al., "R2P2: A Reparameterized Pushforward Policy for Diverse, Precise Generative Path Forecasting", The European Conference on Computer Vision (ECCV). Sep. 2018, pp. 1-17.

Ronneberger, O. et al., "U-net: Convolutional Networks for biomedical Image segmentation", Medical Image Computing and Computer-Assisted Intervention MICCAI, https://doi.org/10.1007/978-3-319-24574-428. Oct. 5, 2015, pp. 1-8.

Ros, G. et al., "The SYNTHIA Dataset: A Large Collection of Synthetic Images for Semantic Segmentation of Urban Scenes", Jun. 2016, pp. 3234-3243.

Sadeghian, A. et al., "SoPhie An Attentive GAN for Predicting Paths Compliant to Social and Physical Constraints", CoRRabs/1806.01482, http://arxiv.org/abs/1806.01482. Jun. 5, 2018, pp. 1-9.

Shah, S. et al., "AirSim High-Fidelity Visual and Physical Simulation for Autonomous Vehicles", CoRR abs/1705.05065, http://arxiv.org/abs/1705.05065. May 15, 2017, pp. 1-14.

Sohn, K. et al., "Learning Structured Output Representation Using Deep Conditional Generative Models", Advances in Neural Information Processing Systems. Dec. 2015, pp. 1-9.

Srikanth, S. et al., "INFER: INtermediate representations for FuturE pRediction", 2019 IEEE/RSJ International Conference on Intelligent Robots and Systems (IROS), https://doi.org/10.1109/iros40897.2019.8968553. Nov. 2019, pp. 1-9.

Sriram, N.N. et al., "A Hierarchical Network for Diverse Trajectory Proposals", 2019 IEEE Intelligent Vehicles Symposium (IV), https://doi.org/10.1109/IVS.2019.8813986. Jun. 2019, pp. 689-694.

Treiber, M. et al., "Congested Traffic States in Empirical Observations and Microscopic Simulations", Physical review. E. Aug. 1, 2000, pp. 1-47.

Treiber, M. et al., "Modeling Lane-changing Decisions with MOBIL", InTraffic and Granular Flow '07, Springer Berlin Heidelberg, Berlin, Heidelberg. Oct. 2008, pp. 211-221.

(56) References Cited

OTHER PUBLICATIONS

Xingjian, S. et al., "Convolutional LSTM Network: A Machine Learning Approach for Precipitation Nowcasting", Advances in neural information processing systems. Jun. 13, 2015, pp. 1-12.

Zhao, T. et al., "Multi-agent Tensor Fusion for Contextual Trajectory Prediction", The IEEE Conference on Computer Vision and Pattern Recognition (CVPR). Jun. 2019, pp. 12126-12134.

Kingma, D.P. et al., "Adam: A Method for Stochastic Optimization", arXiv preprint arXiv:1412.6980. Dec. 22, 2014, pp. 1-15.

Chang et al., "Argoverse: 3D Tracking and Forecasting With Rich Maps", The IEEE Conference on Computer Vision and Pattern Recognition. Jun. 16-21, 2019. pp. 8748-8757.

Geiger et al., "Vision meets Robotics: The KITTI Dataset", International Journal of Robotics Research. vol. 32, No. 11. Sep. 2013. pp. 1-6.

Gupta et al., "Social GAN: Socially acceptable trajectories with generative adversarial networks", Proceedings of the IEEE Conference on Computer Vision and Pattern Recognition. Jun. 18-22, 2018. pp. 2255-2264.

Zhao et al., "Multi-Agent Tensor Fusion for Contextual Trajectory Prediction", The IEEE Conference on Computer Vision and Pattern Recognition. Jun. 16-20, 2019. pp. 12126-12134.

Bansal, Aayush, et al. "Pixelnet: Towards a general pixel-level architecture", arXiv preprint arXiv:1609.06694. Sep. 21, 2016, pp. 1-12.

Casa, Sergio, et al. "SPAGNN: Spatially-aware graph neural networks for relational behavior forecasting from sensor data", arXiv preprint arXiv:1910.08233. Oct. 18, 2019, pp. 1-11.

Chai, Yuning, et al. "Multipath: Multiple probabilistic anchor trajectory hypotheses for behavior prediction", arXiv preprint arXiv:1910.05449. Oct. 12, 2019, pp. 1-14.

Gao, Jiyang, et al. "Vectornet: Encoding hd maps and agent dynamics from vectorized representation", InProceedings of the IEEE/CVF Conference on Computer Vision and Pattern Recognition. Jun. 2020, pp. 11525-11533.

Huang, Xin, et al. "DiversityGAN: Diversity-aware vehicle motion prediction via latent semantic sampling", IEEE Robotics and Automation Letters. Mar. 22, 2020, pp. 1-8.

Ivanovic, Boris, et al. "The trajectron: Probabilistic multi-agent trajectory modeling with dynamic spatiotemporal graphs", InProceedings of the IEEE/CVF International Conference on Computer Vision. Oct. 2019, pp. 2375-2384.

Lee, Namhoon, et al. "Desire: Distant future prediction in dynamic scenes with interacting agents", InProceedings of the IEEE Conference on Computer Vision and Pattern Recognition. Jul. 2017, pp. 336-345.

Liang, Ming, et al. "Learning lane graph representations for motion forecasting", InEuropean Conference on Computer Vision, Springer, Cham. Jul. 27, 2020, pp. 1-18.

Phan-Minh, Tung, et al. "Covernet: Multimodal behavior prediction using trajectory sets", InProceedings of the IEEE/CVF Conference on Computer Vision and Pattern Recognition. Jun. 2020, pp. 14074-14083.

* cited by examiner

Algorithm 1 Divide and Conquer technique

1. procedure DAC(loss, depth)  ▷ All M hypotheses
2. $set_1 = \{loss\}$
3. $list = [set_1]$
4. for $i \leftarrow 2$ to depth do
5.     for $set_k \in list$ do
6.         // Divide $set_k$ into halves
7.         $list \mathrel{+}= [\{set_{k1}\}, \{set_{k2}\}]$
8.         $mSet = \{set_k : \min(set_k) < \min(set_j); \forall j \in \{1..len(list)\}, j \neq k\}$
9. $L_{DAC} = mean(mSet)$
10. return $L_{DAC}$

FIG. 6

DIVIDE-AND-CONQUER FOR LANE-AWARE DIVERSE TRAJECTORY PREDICTION

RELATED APPLICATION INFORMATION

This application claims priority to U.S. Provisional Patent Application No. 63/111,674, filed on Nov. 10, 2020, and U.S. Provisional Patent Application No. 63/113,434, filed on Nov. 13, 2020, incorporated herein by reference in their entireties.

BACKGROUND

Technical Field

The present invention relates to vehicles and more particularly to divide-and-conquer for lane-aware diverse trajectory prediction.

Description of the Related Art

Trajectory prediction is a safety-critical tool for autonomous vehicles to plan and execute actions. Although recent methods have achieved significant state-of-the-art performance by exploiting map data they fail to make use of this information completely as they are provided only as a soft constraint.

SUMMARY

According to aspects of the present invention, a computer-implemented method for driving path prediction is provided. The method includes concatenating past trajectory features and lane centerline features in a channel dimension at an agent's respective location in a top view map of a training scene to obtain concatenated features thereat. The method further includes obtaining, by a convolutional encoder in a single forward pass, convolutional features derived from the top view map, the concatenated features, and a single representation of the training scene that includes the vehicle and interactions with agents in the training scene. The method also includes extracting, by a hypercolumn trajectory encoder, hypercolumn descriptor vectors from the convolutional features. The hypercolumn descriptor vectors include the convolutional features from the agent's respective location in the top view map and an interpolated location in subsequent lower convolutional layers. The method additionally includes obtaining, by a hypercolumn trajectory decoder, primary and auxiliary trajectory predictions from the hypercolumn descriptor vectors. The method further includes generating, by an Inverse Optimal Control (IOC) based ranking module, a respective score for each of the primary and auxiliary trajectory predictions. The method also includes training a vehicle trajectory prediction neural network using a reconstruction loss, a regularization loss objective, and an IOC loss objective responsive to the respective score for each of the primary and auxiliary trajectory predictions.

According to other aspects of the present invention, a computer program product for driving path prediction is provided. The computer program product includes a non-transitory computer readable storage medium having program instructions embodied therewith. The program instructions are executable by a computer to cause the computer to perform a method. The method includes concatenating past trajectory features and lane centerline features in a channel dimension at an agent's respective location in a top view map of a training scene to obtain concatenated features thereat. The method further includes obtaining, by a convolutional encoder in a single forward pass, convolutional features derived from the top view map, the concatenated features, and a single representation of the training scene that includes the vehicle and interactions with agents in the training scene. The method also includes extracting, by a hypercolumn trajectory encoder, hypercolumn descriptor vectors from the convolutional features. The hypercolumn descriptor vectors include the convolutional features from the agent's respective location in the top view map and an interpolated location in subsequent lower convolutional layers. The method additionally includes obtaining, by a hypercolumn trajectory decoder, primary and auxiliary trajectory predictions from the hypercolumn descriptor vectors. The method further includes generating, by an Inverse Optimal Control (IOC) based ranking module, a respective score for each of the primary and auxiliary trajectory predictions. The method also includes training a vehicle trajectory prediction neural network using a reconstruction loss, a regularization loss objective, and an IOC loss objective responsive to the respective score for each of the primary and auxiliary trajectory predictions.

According to yet other aspects of the present invention, a computer processing system for driving path prediction is provided. The computer processing system includes a memory device for storing program code. The computer processing system further includes a processor device operatively coupled to the memory device for running the program code to concatenate past trajectory features and lane centerline features in a channel dimension at an agent's respective location in a top view map of a training scene to obtain concatenated features thereat. The processor device further runs the program code to obtain, using a convolutional encoder in a single forward pass, convolutional features derived from the top view map, the concatenated features, and a single representation of the training scene that includes the vehicle and interactions with agents in the training scene. The processor device also runs the program code to extract, using a hypercolumn trajectory encoder, hypercolumn descriptor vectors from the convolutional features. The hypercolumn descriptor vectors include the convolutional features from the agent's respective location in the top view map and an interpolated location in subsequent lower convolutional layers. The processor device additionally runs the program code to obtain, using a hypercolumn trajectory decoder, primary and auxiliary trajectory predictions from the hypercolumn descriptor vectors. The processor device further runs the program code to generate, using an Inverse Optimal Control (IOC) based ranking module, a respective score for each of the primary and auxiliary trajectory predictions. The processor device also runs the program code to train a vehicle trajectory prediction neural network using a reconstruction loss, a regularization loss objective, and an IOC loss objective responsive to the respective score for each of the primary and auxiliary trajectory predictions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 is a diagram showing exemplary pseudocode for a Divide-And-Conquer technique, in accordance with an embodiment of the present invention.

DETAILED DESCRIPTION OF PREFERRED EMBODIMENTS

Figure 1:
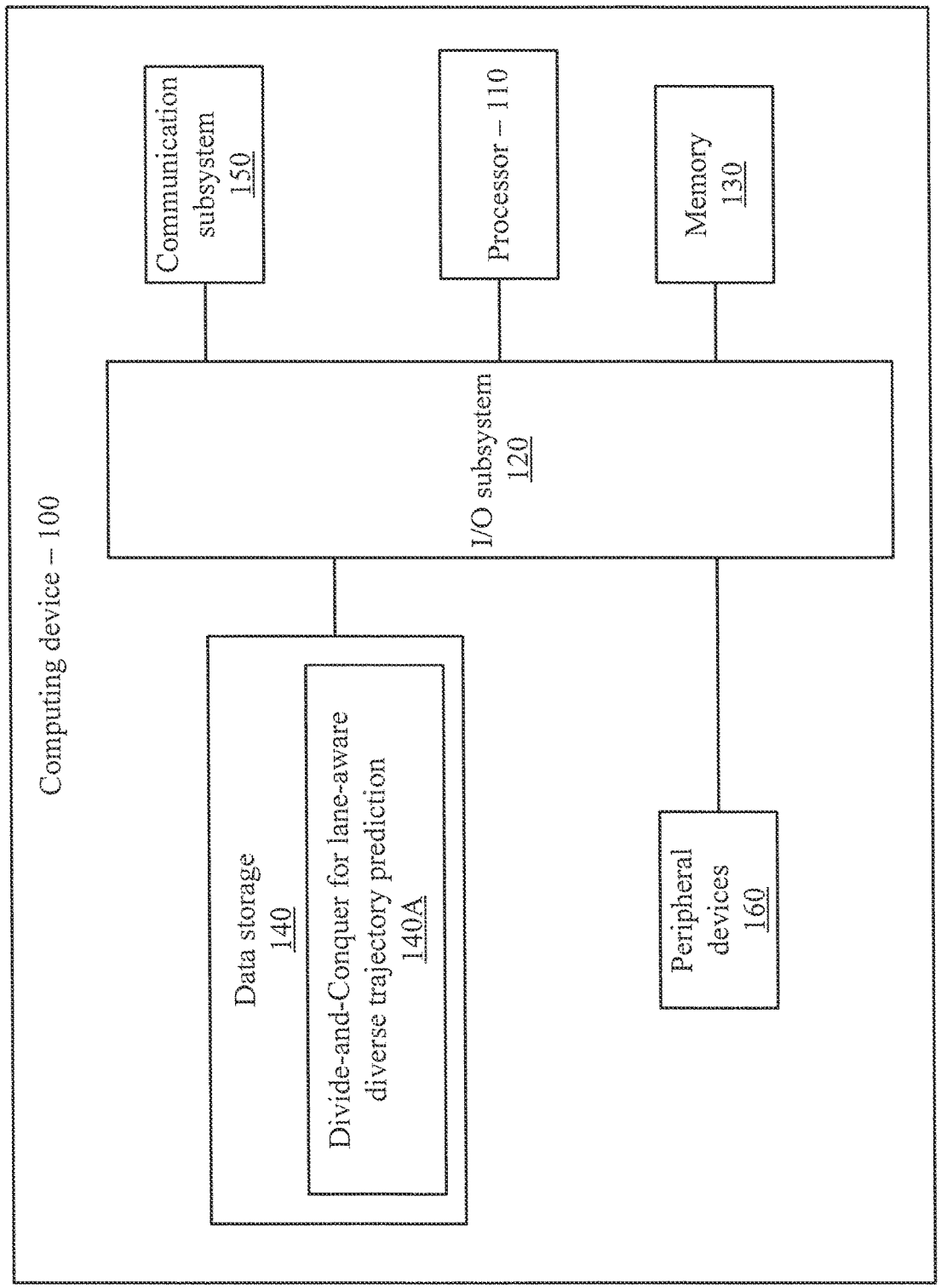
FIG. 1 is a block diagram showing an exemplary computing device, in accordance with an embodiment of the present invention.

Embodiments of the present invention are directed to divide-and-conquer for lane-aware diverse trajectory prediction.

Embodiments of the present invention propose a hybrid prediction framework using lane anchors where trajectories are predicted in Normal-Tangential (NT) coordinates along the lane. The NT predictions provide a strong semantic coupling with the help of lane anchors. To boost performance, auxiliary predictions are made in Cartesian frame (XY) that help in modelling the vehicle dynamics. The NT predictions are then regularized based on XY and vice-versa.

Furthermore, embodiments of the present invention propose an approach, referred to herein as Divide-And-Conquer (DAC), which provides better initialization to the winner-takes-all objective and guarantees to produce diverse hypothesis without any spurious modes.

In accordance with embodiments of the present invention, a novel trajectory prediction problem is proposed which utilizes both HD map data structure and top view rasterized maps as the inputs. More specifically, the present invention transfers both input and solution spaces into tangential co-ordinates along the lane direction to facilitate the learning process. Since vehicles usually follow traffic lanes, it is possible that the prediction model becomes highly dependent on the structure of the lanes and ignores other useful information. Therefore, using HD map information may make the model prone to HD maps probable misinformation and it may result in large errors when drivers do not follow roads semantics. To address this issue, the present invention utilizes the rasterized top view map and agents' trajectory histories in Cartesian coordinate as the auxiliary inputs. Further, the present invention performs an auxiliary prediction in Cartesian space and regularizes NT predictions based on Cartesian outputs to make the network aware of agent dynamics and make NT predictions less susceptible to inconsistent anchors.

Also, in order to address the multi-modality in our trajectory prediction framework, embodiments of the present invention propose a new Winner-Takes-All (WTA) loss function called Divide-And-Conquer (DAC-WTA) that provides better initialization to overcome the problem of spurious output modes. Finally, we employ the proposed DAC-WTA loss function to train a Multiple Choice Learning (MCL) network that is able capture different modes of trajectory prediction problem.

To implement the proposed MCL network, the present invention utilizes scene representation that embeds multi-agent inputs in the channel dimension. Apart from lane anchors, a method in accordance with the present invention takes the rasterized birds-eye-view representation of the scene to provide a global scene context. Convolutions are used to model multi-agent interactions and unlike previous methods which make use of a global context vector, embodiments of the present invention use Hyper-column descriptors to capture interactions at multiple feature scales. Embodiments of the present invention also make use of ranking similar to Inverse Optimal Control (IOC).

FIG. 1 is a block diagram showing an exemplary computing device 100, in accordance with an embodiment of the present invention. The computing device 100 is configured to perform divide-and-conquer for lane-aware diverse trajectory prediction.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code 140A for divide-and-conquer for lane-aware diverse trajectory prediction. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
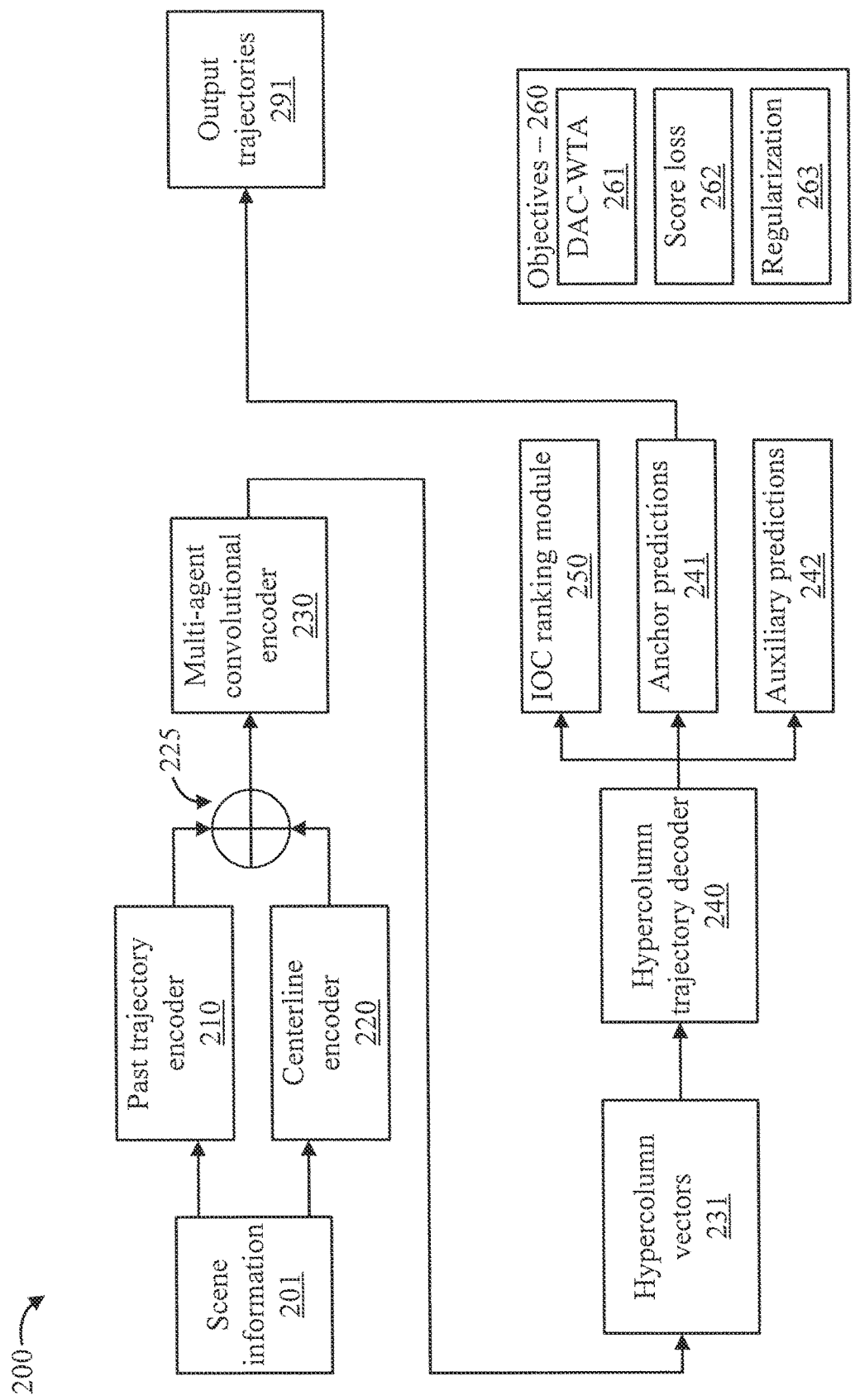
FIG. 2 shows an exemplary system, in accordance with an embodiment of the present invention.

These and other variations of a hardware processor subsystem are also contemplated in accordance with embodiments of the present invention FIG. 2 shows an exemplary system 200, in accordance with an embodiment of the present invention.

The system 200 receives scene information 201. The system 200 includes a past trajectory encoder 210, a centerline encoder 220, a concatenator 225, a multi-agent convolutional encoder 230, a hypercolumn trajectory decoder 240, an Inverse Optimal Control (IOC) based ranking module 250.

The multi-agent convolutional encoder 230 outputs hypercolumn vectors 231.

The hypercolumn trajectory decoder 240 outputs primary (anchor) predictions 241 and auxiliary predictions 242.

The system 200 uses objectives 260 including a Divide and Conquer-Winner Takes All (DAC-WTA) objective 261, a score loss objective 262, and a regularization objective 263.

The system 200 provides output trajectories 291 from the anchor predictions 241.

Figure 3:
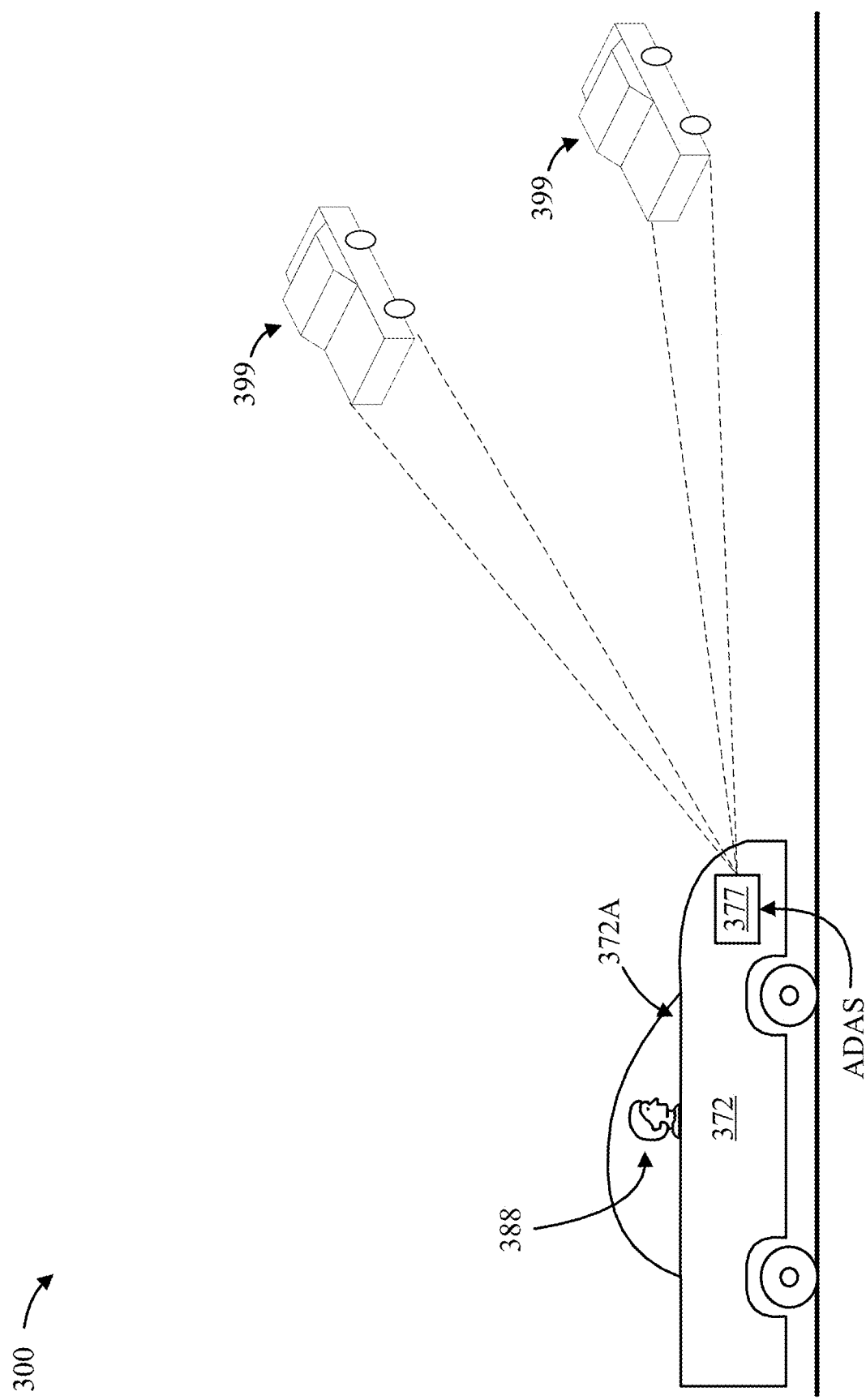
FIG. 3 is a block diagram showing an exemplary environment to which the present invention can be applied, in accordance with an embodiment of the present invention.

FIG. 3 is a block diagram showing an exemplary environment 300 to which the present invention can be applied, in accordance with an embodiment of the present invention.

In the environment 300, a user 388 is located in a scene with multiple objects 399, each having their own locations and trajectories. The user 388 is operating a vehicle 372 (e.g., a car, a truck, a motorcycle, etc.) having an ADAS 377.

The ADAS 377 calculates a lane-aware trajectory prediction.

Responsive to the lane-aware trajectory prediction, a vehicle controlling decision is made. To that end, the ADAS 377 can control, as an action corresponding to a decision, for example, but not limited to, steering, braking, and accelerating systems.

Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 300) may interface with the user through one or more systems of the vehicle 372 that the user is operating. For example, the system of the present invention can provide the user information through a system 372A (e.g., a display system, a speaker system, and/or some other system) of the vehicle 372. Moreover, the system of the present invention (e.g., system 300) may interface with the vehicle 372 itself (e.g., through one or more systems of the vehicle 372 including, but not limited to, a steering system, a braking system, an acceleration system, a steering system, a lighting (turn signals, headlamps) system, etc.) in order to control the vehicle and cause the vehicle 372 to perform one or more actions. In this way, the user or the vehicle 372 itself can navigate around these objects 399 to avoid potential collisions there between. The providing of information and/or the controlling of the vehicle can be considered actions that are determined in accordance with embodiments of the present invention.

Figure 4:
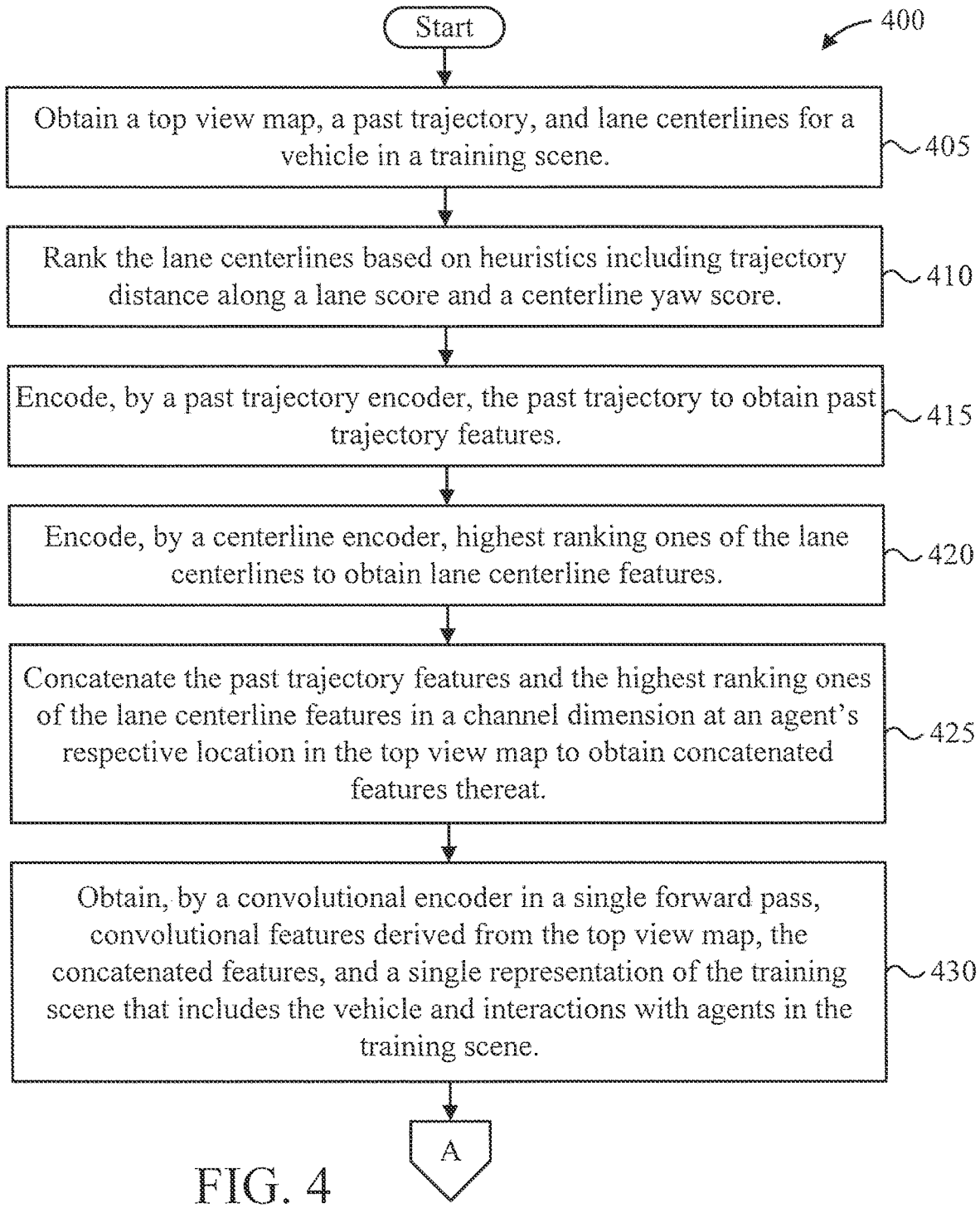
FIGS. 4-5 are flow diagrams showing an exemplary method for vehicle trajectory prediction, in accordance with an embodiment of the present invention.
Figure 5:
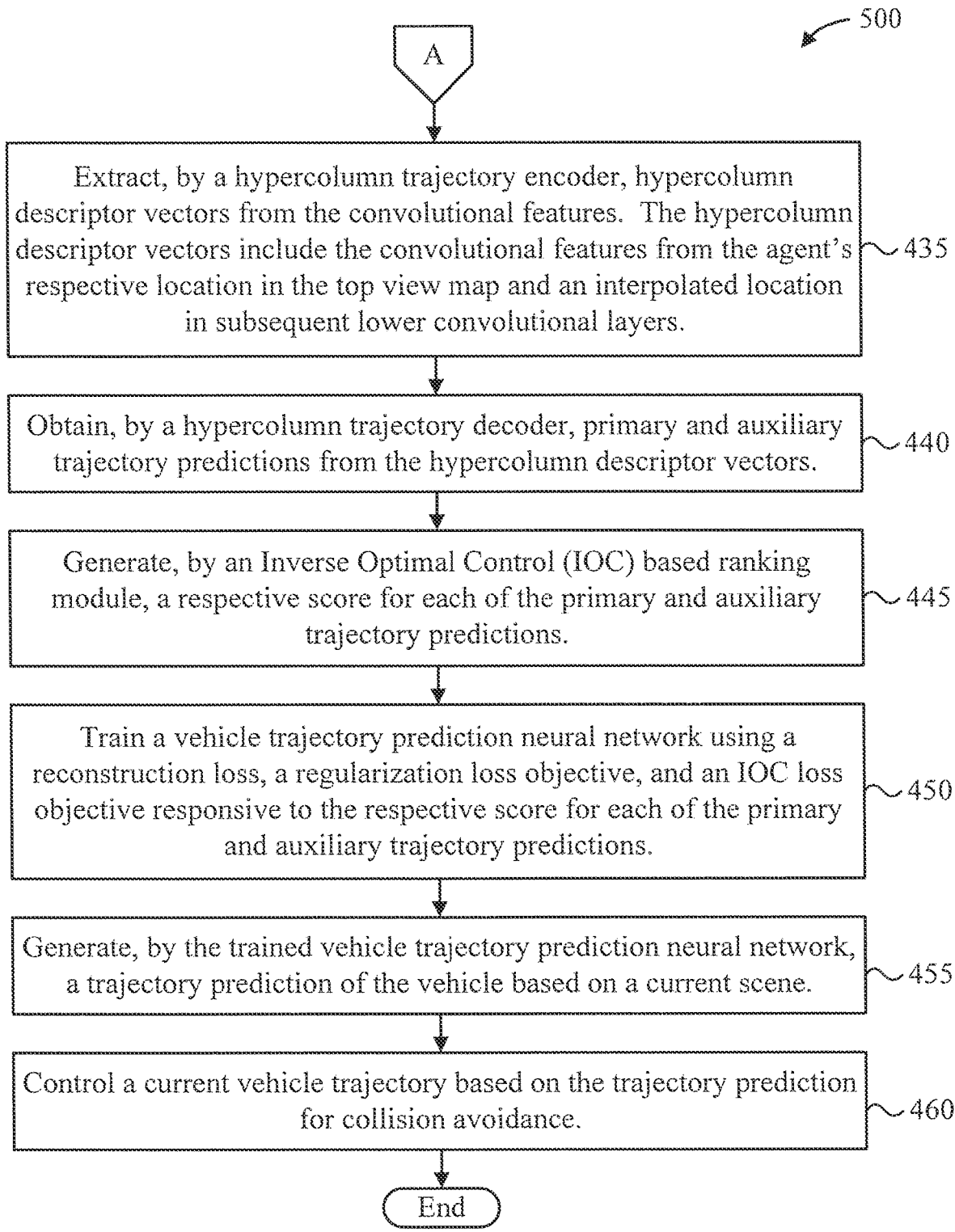

FIGS. 4-5 are flow diagrams showing an exemplary method 400 for vehicle trajectory prediction, in accordance with an embodiment of the present invention.

At block 405, obtain a top view map, a past trajectory, and lane centerlines for a vehicle in a training scene.

At block 410, rank the lane centerlines based on heuristics including trajectory distance along a lane score and a centerline yaw score.

At block 415, encode, by a past trajectory encoder, the past trajectory to obtain past trajectory features.

At block 420, encode, by a centerline encoder, highest ranking ones of the lane centerlines to obtain lane centerline features.

At block 425, concatenate the past trajectory features and the highest ranking ones of the lane centerline features in a channel dimension at an agent's respective location in the top view map to obtain concatenated features thereat.

At block 430, obtain, by a convolutional encoder in a single forward pass, convolutional features derived from the top view map, the concatenated features, and a single representation of the training scene that includes the vehicle and interactions with agents in the training scene.

At block 435, extract, by a hypercolumn trajectory encoder, hypercolumn descriptor vectors from the convolutional features. The hypercolumn descriptor vectors include the convolutional features from the agent's respective location in the top view map and an interpolated location in subsequent lower convolutional layers. The hypercolumn descriptors vectors capture interactions and a global context of the training scene at different scales with respect to each of the agents present in the scene.

At block 440, obtain, by a hypercolumn trajectory decoder, primary and auxiliary trajectory predictions from the hypercolumn descriptor vectors.

At block 445, generate, by an Inverse Optimal Control (IOC) based ranking module, a respective score for each of the primary and auxiliary trajectory predictions.

At block 450, train a vehicle trajectory prediction neural network using a reconstruction loss, a regularization loss objective, and an IOC loss objective responsive to the respective score for each of the primary and auxiliary trajectory predictions.

At block 455, generate, by the trained vehicle trajectory prediction neural network, a trajectory prediction of the vehicle based on a current scene.

At block 460, control a current vehicle trajectory based on the trajectory prediction for collision avoidance. Block 460 can involve controlling a vehicle system to control the current vehicle trajectory based on the trajectory prediction for collision avoidance.

FIG. 6 is a diagram showing exemplary pseudocode 600 for a Divide-And-Conquer technique, in accordance with an embodiment of the present invention.

A description will now be given regarding divide and conquer, in accordance with an embodiment of the present invention.

Here, a detailed description of a method in training Multi-Hypothesis prediction networks where the approach acts as an initialization technique for winner-takes-all objective. Let X denote the vector space of inputs and y denotes the vector space of output variables. Let $D=\{(x_i,y_i), \ldots, (x_N,y_N)\}$ be a set of N training tuples and $p(x,y)=p(y|x)p(x)$ be the joint probability density. The goal is to learn a function $f_\theta: X \rightarrow y^M$ that maps every input in X to a set of M hypotheses. Mathematically, we define the following:

$$f_\theta(x) = (f_\theta^1(x), \ldots, f_\theta^M(x)). \tag{1}$$

Winner-takes-all objective minimizes the loss with the closest of M hypotheses:

$$\int_X \Sigma_{j=1}^M \int_{y_j(x)} L(f_\theta^j(x), y) p(x,y) dy dx, \tag{2}$$

where $y_j$ is the Voronoi tessellation of label space with $y=\cup_{j=1}^M Y_j$. This objective leads to Centroidal Voronoi tessellation of outputs where each hypothesis minimizes to the probabilistic mass centroid of the Voronoi label space $y_j$ enclosed by it. In practice, to obtain diverse hypotheses WTA objective can be written as a meta loss as follows:

$$L_{WTA} = \sum_{k=1}^{K} \delta_k \left( k == \arg\min_i L(f_\theta^i) \right) L(f_\theta^k(x), y), \tag{3}$$

where $\delta(\cdot)$ is the Kronecker delta function with value 1 when condition is True and 0 otherwise.

A description will now be given regarding initialization difficulties for WTA, in accordance with an embodiment of the present invention.

Equation 3 can be compared to the EM algorithm and K-means clustering where they depend mainly on initialization for optimal convergence. This makes the training process very brittle as the Voronoi region of only few hypotheses encloses the data distribution, leaving most of the hypotheses untrained due to winner-takes-all objective. The alternative solution to solve the convergence problem by assigning $\in$ weight to the non-winners does not work as every ground truth associates with atmost one hypothesis making other non-winners to reach the equilibrium. It has been proposed an evolving winner-takes-all (EWTA) objective where they update the top k winners. The k varies starting from k=M to k=1 leading to winner takes all objective in the training process. This method captures the data distribution better compared to RWTA and WTA but still produces hypothesis with incorrect modes.

A description will now be given for DAC for diverse non-spurious modes, in accordance with an embodiment of the present invention.

A novel initialization technique is proposed herein called Divide and Conquer that alleviates the problem of spurious modes, leaving the Voronoi region of every output hypothesis to capture some part of the data. We divide M hypotheses into k sets and update the set with argmin outputs to match the ground truth. The value of k starts with 1 and increases exponentially as every set is broken down into two halves as we progress through the training. This creates a binary tree with the depth of the tree dependent on the number of output hypotheses M. Algorithm 1 of FIG. 6 shows pseudo-code of the proposed Divide and Conquer technique. Here depth specifies the maximum depth that can be reached in the current training stage and we define list as variable containing set of hypotheses at any stage in the training. Further, we define newly formed sets from $k^{th}$ set as $set_{k1}$ and $set_{k2}$. Set from the list that produces argmin output is denoted as mSet. Finally, we take mean loss of all hypotheses in mSET to get $L_{DAC}$.

With k=1 and list containing a single set, all M hypotheses reach towards the equilibrium. As the number of sets in the list, the hypotheses divide the distribution space based on the Voronoi region to capture the different parts of the data. The effective number of outputs grows at every stage, with the data captured by the $k^{th}$ set in the previous stage split across two newly formed sets in the next stage. Finally, as we reach the leaf nodes, every set contains one hypothesis leading to a winner-takes-all objective similar to Equation 3.

DAC starts with all hypotheses fitting the whole data and at every stage DAC ensures some data to be enclosed in the Voronoi space. During split, hypotheses divide the data enclosed within their Voronoi space to reach new equilibrium. Although, DAC does not guarantee equal number of hypotheses capturing different modes of the data, it ensures convergence. Further, we would like to note that DAC does not have any significant computational complexity as only dividing into sets and min calculations are involved.

A description will now be given regarding trajectory prediction with lane anchors, in accordance with an embodiment of the present invention.

Here, a single representation model is introduced called ALAN that produces lane aware trajectories for multiple agents in a forward pass. The problem is formulated as a one shot regression of diverse hypotheses across time steps.

A description of a problem statement will now be given, in accordance with an embodiment of the present invention.

The method of the present invention takes scene context input in two forms: a) rasterized birds-eye-view (BEV) representation of the scene denoted as I of size H×W×3 and b) per-agent lane centerline information as anchors. The present invention defines lane anchors $L=\{L_1, \ldots L_p\}$ as a sequence of p points with coordinates $L_p=(x, y)$ in the BEV frame of reference. The present invention denotes $X_i=\{X_i^1, \ldots X_i^T\}$ as trajectory coordinates including past and future observations of the agent i in Cartesian form, where $X_i^t=(x_i^t, y_i^t)$. For every agent i, a set of candidate lanes are identified that the vehicle may take based on trajectory information like closest distance, yaw alignment and other parameters. This set is denoted as plausible lane centerlines $A=\{L_1, \ldots, L_k\}$, where k represents total number of lane centerlines along which the vehicle may possibly travel. The present invention then defines vehicle trajectories $X_i$ along these centerlines in a 2d curvilinear normal-tangential (nt) coordinate frame. $N_{i,k}=\{N_{i,k}^1, \ldots, N_{i,k}^T\}$ denotes the nt coordinates for the agent i along the centerline $L_k$, where $N_{i,k}^t=(n_{i,k}^t, l_{i,k}^t)$ denotes normal and longitudinal distance to the closest point along the lane. Use of nt coordinates is crucial to capture complex road topologies and associated dynamics to provide predictions that are semantically aligned.

The trajectory prediction problem is defined as the task of predicting $^{nt}Y_{i,k}=\{N_{i,k}^{tobs}, \ldots, N_{i,k}^T\}$ for the given lane anchor $L_k$ provided as input to the network. The present invention follows an input representation where it encodes agent specific information at their respective $X_i^{tobs}$ locations on the spatial grid. Finally, to get trajectories in BEV frame of reference, the present invention converts output predictions to cartesian coordinates based on the anchor $L_{i,k}$ given as input to the network.

A description will now be given regarding the ALAN framework for trajectory prediction, in accordance with an embodiment of the present invention.

An overview of our framework is shown in FIG. 2. An embodiment of the present invention can include the following five major components: a) a centerline encoder b) a past trajectory encoder c) a multi-agent convolutional interaction encoder d) hypercolumn trajectory decoder and e) an Inverse Optimal Control (IOC) based on ranking module.

Regarding the centerline encoder, the present invention encodes input lane information $L_{i,k}$ for every agent through a series of 1D convolutions to produce an embedded vector $C_{i,k}=C_{enc}(L_{i,k})$ for every agent in the scene.

Regarding the past trajectory encoder, apart from nt coordinates $N_{i,k}$ for the lane anchor, the present invention provides additional $X_i$ as input to the past encoder. The present invention first embeds the temporal inputs through a MLP and then passes it through a LSTM network to provide a past state vector $h_i^{tobs}$. Formally, $$s_i^t = MLP(X_i^t, N_{i,k}^t) \tag{4}$$

$$h_i^{tobs} = LSTM(s_i^1 \cdots {}^{tobs}) \tag{5}$$

A description will now be given regarding the multi-agent convolutional encoder, in accordance with an embodiment of the present invention.

The present invention realizes multiagent prediction of trajectories in a forward pass through a convolutional encoder module. First, the present invention encodes agent specific information $C_{i,k}, h_i^{tobs}$ at their respective locations $X_i^{tobs}$ in the BEV spatial grid. This produces a scene state map S of size H×W×128 containing information of every agent in the scene. The present invention then passes this through a convolutional encoder along with the rasterized BEV map I to produce activations at various feature scales. In order to extract hypercolumn descriptors $D_1$ from their locations, the hypercolumn descriptor contains features extracted at various scales by bi-linearly interpolating $X_i^{tobs}$ for different feature dimensions. Thus, $$D_1 = [c_1(X_i^t), \ldots, c_k(X_i^t)], \tag{6}$$

where $c_k$ is the feature extracted at $k^{th}$ layer by bilinearly interpolating the input location to the given dimension. The intuition is to capture interactions at different scales when higher convolutional layers capturing the global context and low-level features retaining the nearby interactions.

A description will now be given regarding a hypercolumn trajectory decoder, in accordance with an embodiment of the present invention.

The hypercolumn descriptor $D_i$ of every agent is then fed through a decoder including a series of 1×1 convolutions to output M hypotheses at once. Here, two variants of ALAN prediction are investigated: ALAN-nt where we predict nt trajectories $^{nt}\hat{Y}_i$ in the direction of the lane; and ALAN-ntxy which also provides an auxiliary xy predictions $^{xy}\hat{Y}_i$. Linear values in nt can correspond to trajectories of higher degrees based on the input anchor. Moreover, two trajectories having the same nt values can have completely different dynamics. Thus, we make use of the auxiliary predictions to regularize anchor based outputs to make the network aware of agent dynamics and less susceptible to bad anchors. The M hypotheses predicted from our network is given as:

$$^{nt}\hat{Y}_i, ^{xy}\hat{Y}_i = CNN_{1*1}(D_i) \tag{7}$$

$$^{nt}\hat{Y}_i = \{^{nt}\hat{Y}_{i,1}, ^{nt}\hat{Y}_{i,2} \ldots, ^{nt}\hat{Y}_{i,M}\} \tag{8}$$

$$^{xy}\hat{Y}_i = \{^{xy}\hat{Y}_{i,1}, ^{xy}\hat{Y}_{i,2} \ldots, ^{xy}\hat{Y}_{i,M}\} \tag{9}$$

A description will now be given regarding a ranking module, in accordance with an embodiment of the present invention.

The present invention generates scores $^sY_i = \{^sY_{i,1}, ^sY_{i,2} \ldots, ^sY_{i,M}\}$ for the M output hypotheses. It measures the goodness $^sY_{i,k}$ of predicted hypotheses by assigning rewards that maximizes towards their goal. The module uses predictions $^{nt}\hat{Y}^i$ to obtain the target distribution q, where $q = softmax(-d(^{nt}Y_i, ^{nt}\hat{Y}_i))$ and d being L2 distance between the ground truth and predicted outputs. Thus, the score loss is given as $L_{score} = Cross-Entropy(^sY_i, q)$.

A description will now be given regarding learning, in accordance with an embodiment of the present invention.

The present invention supervises the network outputs $\{{}^{nt}\hat{Y}_i, {}^{xy}\hat{Y}_i\}$ as the L2 distance with their respective ground truth labels ${}^{nt}Y$ for the input lane anchor $L_k$ and ${}^{xy}Y$. The proposed Divide and Conquer technique is used to train a Multi-Hypothesis prediction network. Hence, the reconstruction loss for both primary and auxiliary predictions is given by the following:

$${}^{nt}L_{DAC} = \text{DAC}({}^{nt}\hat{Y}_i), \tag{10}$$

$${}^{xy}L_{DAC} = \text{DAC}({}^{xy}\hat{Y}_i), \tag{11}$$

Additionally, the present invention penalizes the anchor based predictions based on ${}^{xy}\hat{Y}_i$ by transforming the predictions to nt coordinates ${}^{xy}\hat{Y}_i{}^{nt}$ along the input lane. The present invention also adds the regularization the other way to penalize ${}^{xy}\hat{Y}_i$ predictions based on the anchor outputs ${}^{nt}\hat{Y}_i$ converting them to xy coordinates ${}^{xy}\hat{Y}_i{}^{xy}$. The present invention adds the regularization as L2 distance between the converted primary and auxiliary predictions for all hypotheses as follows:

$${}^{nt}L_{xy} = L2({}^{nt}\hat{Y}_i, {}^{xy}\hat{Y}_i{}^{nt}), \tag{12}$$

$${}^{xy}L_{nt} = L2({}^{xy}\hat{Y}_i, {}^{nt}\hat{Y}_i{}^{xy}), \tag{13}$$

The total learning objective for the network to minimize can be given by the following:

$$L = {}^{nt}L_{DAC} + {}^{xy}L_{DAC} + \lambda_1 {}^{nt}L_{xy} + \lambda_2 {}^{xy}L_{nt} + L_{score}. \tag{14}$$

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for driving path prediction and current trajectory control by an advanced driver-assistance system (ADAS) that is integrated into an autonomous vehicle, comprising:
   obtaining a top view map, a past trajectory, and lane centerlines for the autonomous vehicle in a training scene as initial training inputs;
   ranking the lane centerlines based on heuristics including trajectory distance along a lane score and a centerline yaw score;
   concatenating past trajectory features and lane centerline features in a channel dimension at an agent's respective location in the top view map of the training scene to obtain concatenated features thereat;
   obtaining, by a convolutional encoder of the ADAS in a single forward pass, convolutional features derived from the top view map, the concatenated features, and a single representation of the training scene that includes the vehicle and interactions with agents in the training scene;
   extracting, by a hypercolumn trajectory encoder of the ADAS, hypercolumn descriptor vectors from the convolutional features, the hypercolumn descriptor vectors including the convolutional features from the agent's respective location in the top view map and an interpolated location in subsequent lower convolutional layers;
   obtaining, by a hypercolumn trajectory decoder of the ADAS, primary and auxiliary trajectory predictions from the hypercolumn descriptor vectors;
   generating, by an Inverse Optimal Control (IOC) based ranking module of the ADAS, a respective score for each of the primary and auxiliary trajectory predictions;
   training a vehicle trajectory prediction neural network of the ADAS using a reconstruction loss, a regularization loss objective, and an IOC loss objective responsive to the respective score for each of the primary and auxiliary trajectory predictions;
   generating a trajectory prediction of the autonomous vehicle using the vehicle trajectory prediction neural network; and
   using the ADAS to autonomously control a current trajectory of the autonomous vehicle based on the trajectory prediction, where the ADAS autonomously controls the vehicle using one or more of a steering system, a braking system, and an accelerating system of the vehicle.

2. The computer-implemented method of claim 1, further comprising encoding, by a past trajectory encoder, the past trajectory to obtain the past trajectory features.

3. The computer-implemented method of claim 1, further comprising encoding, by a centerline encoder, the lane centerlines to obtain the lane centerline features.

4. The computer-implemented method of claim 1, further comprising:
   generating, by the trained vehicle trajectory prediction neural network, a trajectory prediction of the vehicle based on a current scene; and
   controlling a vehicle system to control a current vehicle trajectory for collision avoidance based on the trajectory prediction.

5. The computer-implemented method of claim 1, wherein the hypercolumn trajectory decoder comprises a plurality of 1×1 convolutions producing a plurality of outputs for each of the agents.

6. The computer-implemented method of claim 1, wherein the primary predictions are in normal tangential coordinates, and wherein the auxiliary features are in global cartesian coordinates of the top view map to regularize the primary predictions.

7. The computer-implemented method of claim 1, wherein the IOC loss objective maximizes a cumulative rewards for each of the primary trajectory predictions.

8. The computer-implemented method of claim 1, wherein the hypercolumn descriptors vectors capture interactions and a global context of the training scene at different scales with respect to each of the agents present in the scene.

9. A computer program product for driving path prediction and current trajectory control by an advanced driver-assistance system (ADAS) that is integrated into an autonomous vehicle, the computer program product comprising a non-transitory computer readable storage medium having program instructions embodied therewith, the program instructions executable by a computer to cause the computer to perform a method comprising:
 obtaining a top view map, a past trajectory, and lane centerlines for the autonomous vehicle in a training scene as initial training inputs;
 ranking the lane centerlines based on heuristics including trajectory distance along a lane score and a centerline yaw score;
 concatenating past trajectory features and lane centerline features in a channel dimension at an agent's respective location in the top view map of the training scene to obtain concatenated features thereat;
 obtaining, by a convolutional encoder of the ADAS in a single forward pass, convolutional features derived from the top view map, the concatenated features, and a single representation of the training scene that includes the vehicle and interactions with agents in the training scene;
 extracting, by a hypercolumn trajectory encoder of the ADAS, hypercolumn descriptor vectors from the convolutional features, the hypercolumn descriptor vectors including the convolutional features from the agent's respective location in the top view map and an interpolated location in subsequent lower convolutional layers;
 obtaining, by a hypercolumn trajectory decoder of the ADAS, primary and auxiliary trajectory predictions from the hypercolumn descriptor vectors;
 generating, by an Inverse Optimal Control (IOC) based ranking module of the ADAS, a respective score for each of the primary and auxiliary trajectory predictions;
 training a vehicle trajectory prediction neural network of the ADAS using a reconstruction loss, a regularization loss objective, and an IOC loss objective responsive to the respective score for each of the primary and auxiliary trajectory predictions;
 generating a trajectory prediction of the autonomous vehicle using the vehicle trajectory prediction neural network; and
 using the ADAS to autonomously controlling a current trajectory of the autonomous vehicle based on the trajectory prediction, where the ADAS autonomously controls the vehicle using one or more of a steering system, a braking system, and an accelerating system of the vehicle.

10. The computer program product of claim 9, further comprising encoding, by a past trajectory encoder, the past trajectory to obtain the past trajectory features.

11. The computer program product of claim 9, further comprising encoding, by a centerline encoder, the lane centerlines to obtain the lane centerline features.

12. The computer program product of claim 9, further comprising:
 generating, by the trained vehicle trajectory prediction neural network, a trajectory prediction of the vehicle based on a current scene; and
 controlling a vehicle system to control a current vehicle trajectory for collision avoidance based on the trajectory prediction.

13. The computer program product of claim 9, wherein the hypercolumn trajectory decoder comprises a plurality of 1×1 convolutions producing a plurality of outputs for each of the agents.

14. The computer program product of claim 9, wherein the primary predictions are in normal tangential coordinates, and wherein the auxiliary features are in global cartesian coordinates of the top view map to regularize the primary predictions.

15. The computer program product of claim 9, wherein the IOC loss objective maximizes a cumulative rewards for each of the primary trajectory predictions.

16. A computer processing system for driving path prediction and current trajectory control by an advanced driver-assistance system (ADAS) that is integrated into an autonomous vehicle, comprising:
 a memory device for storing program code; and
 a processor device operatively coupled to the memory device for running the program code to:
  obtain a top view map, a past trajectory, and lane centerlines for the autonomous vehicle in a training scene as initial training inputs;
  rank the lane centerlines based on heuristics including trajectory distance along a lane score and a centerline yaw score;
  concatenate past trajectory features and lane centerline features in a channel dimension at an agent's respective location in the top view map of the training scene to obtain concatenated features thereat;
  obtain, by a convolutional encoder of the ADAS in a single forward pass, convolutional features derived from the top view map, the concatenated features, and a single representation of the training scene that includes the vehicle and interactions with agents in the training scene;
  extract, by a hypercolumn trajectory encoder of the ADAS, hypercolumn descriptor vectors from the convolutional features, the hypercolumn descriptor vectors including the convolutional features from the agent's respective location in the top view map and an interpolated location in subsequent lower convolutional layers;
  obtain, by a hypercolumn trajectory decoder of the ADAS, primary and auxiliary trajectory predictions from the hypercolumn descriptor vectors;
  generate, by an Inverse Optimal Control (IOC) based ranking module of the ADAS, a respective score for each of the primary and auxiliary trajectory predictions;
  train a vehicle trajectory prediction neural network of the ADAS using a reconstruction loss, a regularization loss objective, and an IOC loss objective responsive to the respective score for each of the primary and auxiliary trajectory predictions;
 generate a trajectory prediction of the autonomous vehicle using the vehicle trajectory prediction neural network; and
 use the ADAS to autonomously control a current trajectory of the autonomous vehicle based on the trajectory prediction, where the ADAS autonomously controls the vehicle using one or more of a steering system, a braking system, and an accelerating system of the vehicle.

* * * * *